United States Patent [19]
Tanaka

[11] Patent Number: 5,174,258
[45] Date of Patent: Dec. 29, 1992

[54] INDUCTION SYSTEM FOR SNOWMOBILE

[75] Inventor: Hiroshi Tanaka, Iwata, Japan

[73] Assignee: Yamaha Hatsudoki Kabushiki Kaisha, Iwata, Japan

[21] Appl. No.: 820,325

[22] Filed: Jan. 13, 1992

[30] Foreign Application Priority Data

Jan. 16, 1991 [JP] Japan .................................. 3-17072

[51] Int. Cl.⁵ .............................................. F02B 77/00
[52] U.S. Cl. ................................ 123/198 E; 180/68.3
[58] Field of Search ........................... 123/198 E, 556; 180/190, 68.3; 181/229; 55/276, DIG. 21

[56] References Cited

U.S. PATENT DOCUMENTS 4,155,414 5/1979 Fujikawa et al. .................... 180/190

FOREIGN PATENT DOCUMENTS 1-244113 9/1989 Japan .............................. 123/198 E Primary Examiner—Noah P. Kamen
Attorney, Agent, or Firm—Ernest A. Beutler

[57] ABSTRACT

An induction system for the internal combustion engine of a snowmobile that includes first and second air filters the first of which is disposed within the engine compartment and is not readily viewed by the operator and the second of which is disposed so that it can be viewed externally from the engine compartment for the operator to determine if it has been clogged with snow and requires servicing. In addition, a portion of the air flowing to the engine is heated by passing it through the engine compartment while another portion is direct atmospheric air for controlling the temperature of the air delivered to the engine without large temperature variations to insure better running under all ambient conditions.

13 Claims, 7 Drawing Sheets

INDUCTION SYSTEM FOR SNOWMOBILE

BACKGROUND OF THE INVENTION

This invention relates to an induction system for an internal combustion engine and more particularly an improved induction system for the powering internal combustion engine of a snowmobile.

It is the normal practice in snowmobiles to position the powering internal combustion engine within an engine compartment. This is done to protect the engine from the surrounding environment and also to insure that the engine can operate at the desired temperature. However, by so enclosing the engine certain components of the engine which may require frequent servicing also become enclosed.

For example, it is the normal practice to employ an induction system for the engine that incorporates a filter element for precluding foreign material from entering into the engine through its induction system. However, if the induction system and filter element is positioned within the engine compartment, then it is difficult if not impossible for the operator to readily determine if the filter element has been clogged. Clogging of filter elements is a common problem with snowmobiles due to the fact that they operate in an atmosphere wherein fine snow particles are always swirling around the engine. These snow particles can imbed themselves in the inlet side of the filter element and if this is not seen by the operator, then the engine efficiency can seriously deteriorate.

It is, therefore, a principal object of this invention to provide an induction system for the engine of a snowmobile wherein the condition of the filter element may be readily viewed by the operator.

It is a further object of this invention to provide an improved filtering arrangement for the induction system of a snowmobile engine.

In connection with the induction system for a snowmobile engine, it is desirable to insure that the engine can induct air that is not at an elevated temperature. However, it is also desirable to insure that the temperature of the air inducted into the engine remains fairly constant through out the running conditions. If the temperature of the inducted air varies, then the fuel air ratio can vary in relation to the air temperature and result in uneven performance. This becomes a problem if all of the induction air for the engine is drawn from the atmosphere and is not preheated.

It is, therefore, a still further object of this invention to provide an induction system for an internal combustion engine powering a snowmobile wherein the temperature of the inducted air is maintained more uniform regardless of ambient conditions.

SUMMARY OF THE INVENTION

A first feature of this invention is adapted to be embodied in an induction system for the internal combustion engine of a snow vehicle having a body defining an engine compartment in which the engine is at least in part contained. The engine has an intake port and the induction system has an outlet that communicates with the inlet port and a first filter for filtering air flowing to the intake port. The first air filter is positioned within the body and is normally concealed from view. A second air filter is disposed across an opening in the body for filtering the air flowing to the intake port and in a position exposed to view so that an operator may view when snow is clogging the second air filter.

Another feature of the invention is adapted to be embodied in an induction system for the internal combustion engine of a snow vehicle having a body defining an engine compartment in which the engine is at least in part contained. The engine has an intake port. The induction system includes a first portion that draws atmospheric air and passes this air through the engine compartment for heating before it is delivered to the intake port and a second portion that draws atmospheric air directly and delivers it to the intake port with minimal heating in the engine compartment so as to maintain a substantially uniform temperature for the air inducted.

DETAILED DESCRIPTION OF THE PREFERRED EMBODIMENT OF THE INVENTION

Figure 1:
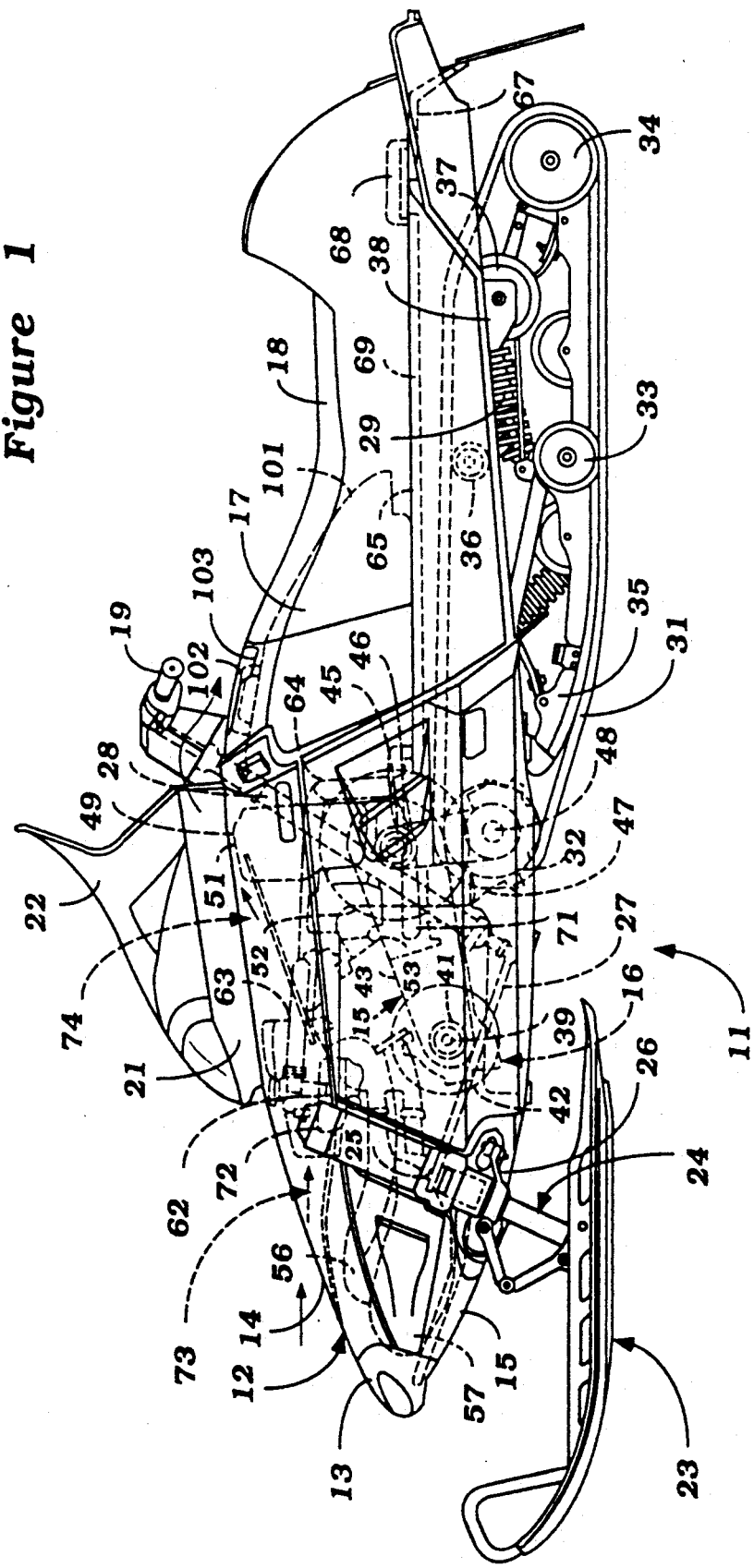
FIG. 1 is a side elevational view of a snowmobile constructed in accordance with an embodiment of the invention.
Figure 2:
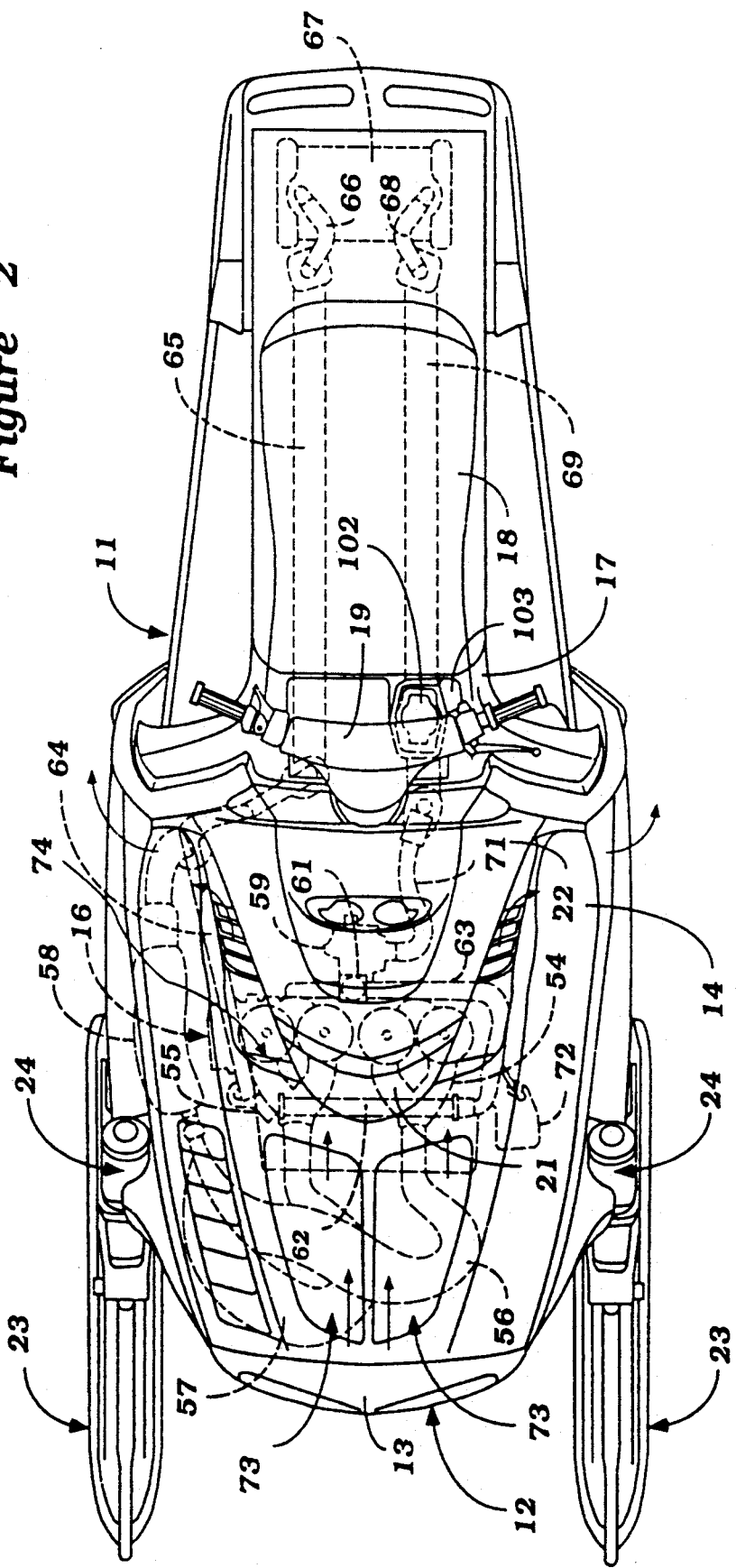
FIG. 2 is a top plan view of the snowmobile.
Figure 3:
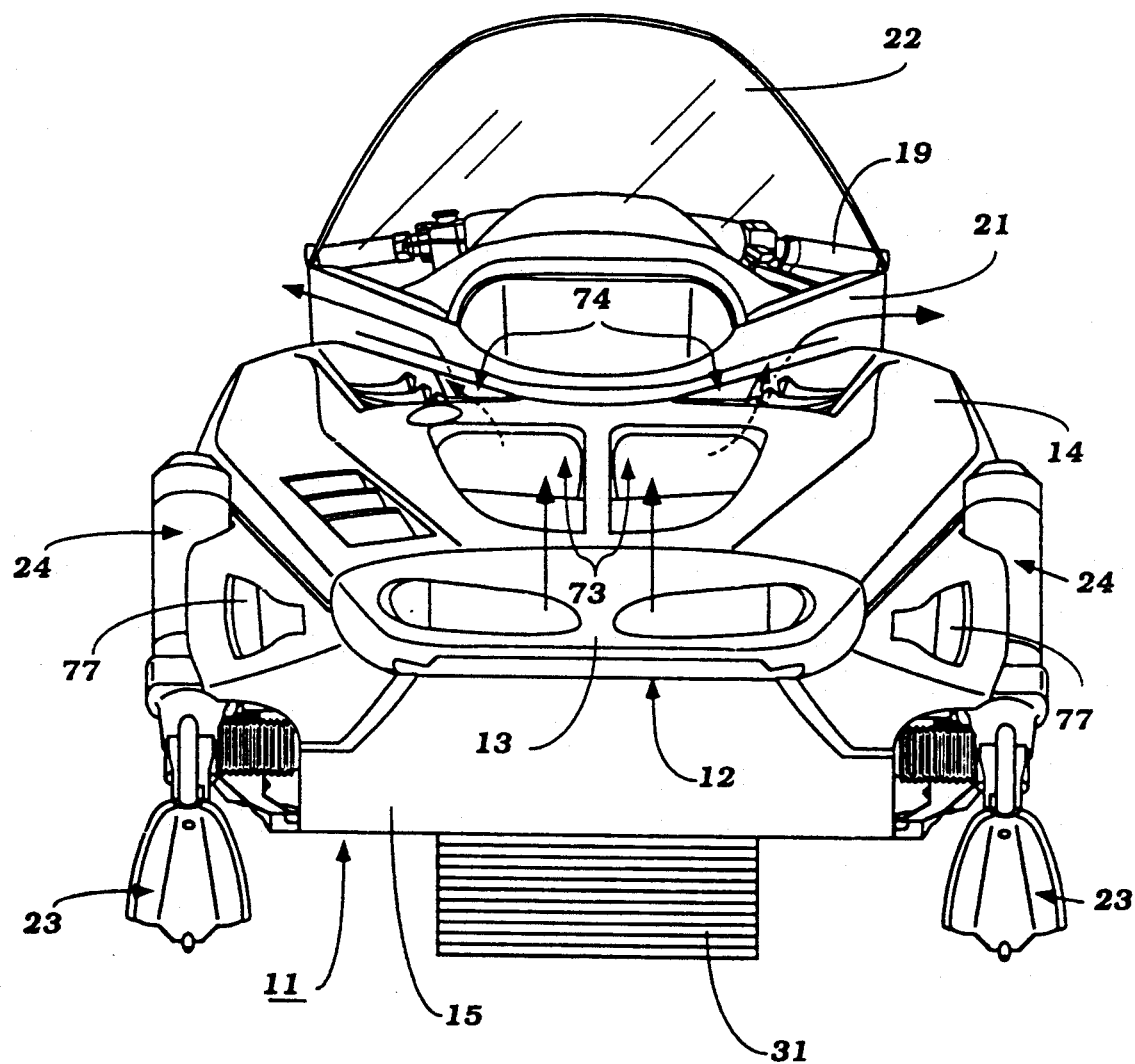
FIG. 3 is an enlarged front elevational view of the snowmobile.
Figure 4:
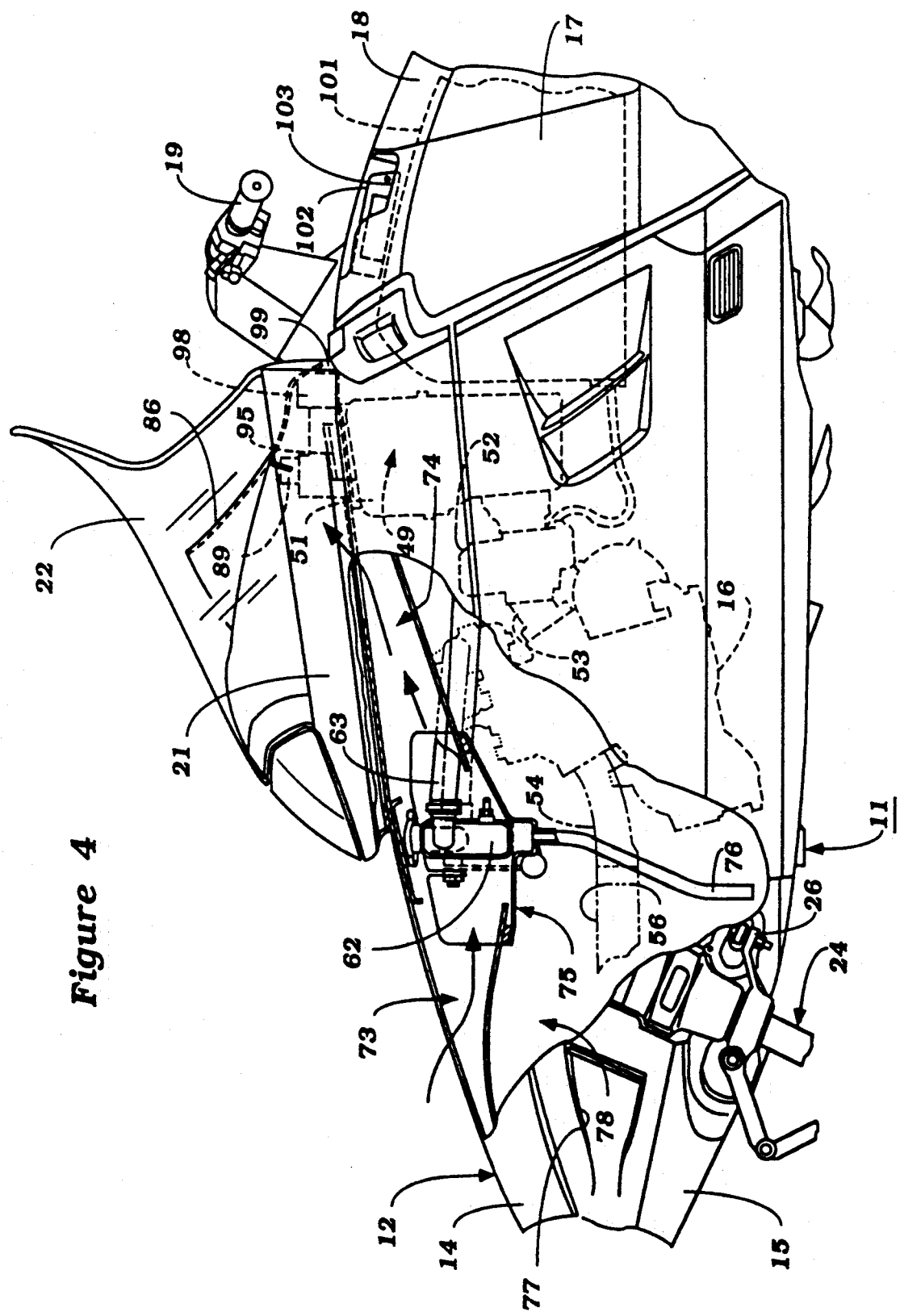
FIG. 4 is a further enlarged side elevational view of the engine compartment portion of the snowmobile with a portion broken away to show the inlet air system and its relationship to the radiator.
Figure 5:
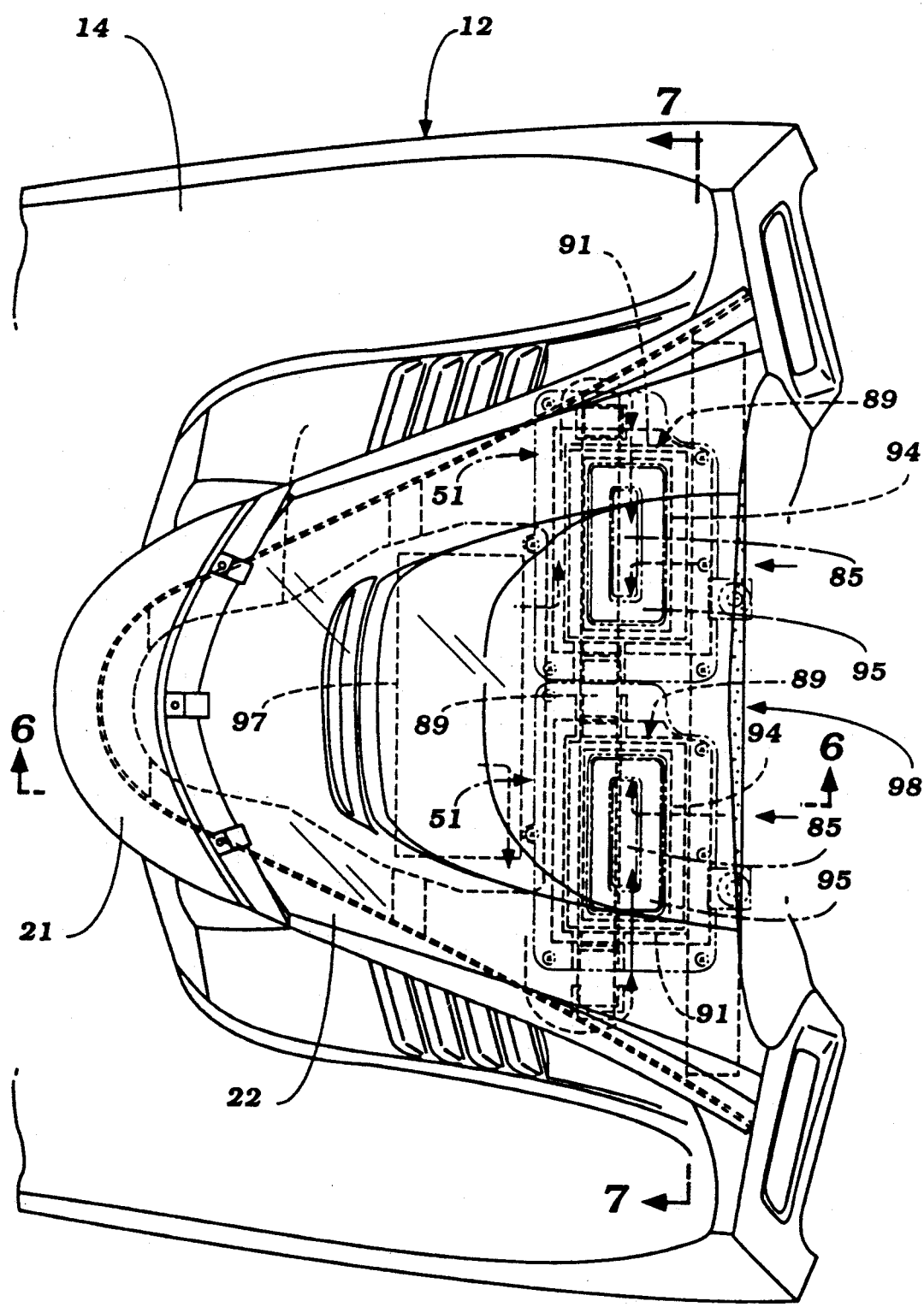
FIG. 5 is a top plan view of the portion of the snowmobile shown in FIG. 4.
Figure 6:
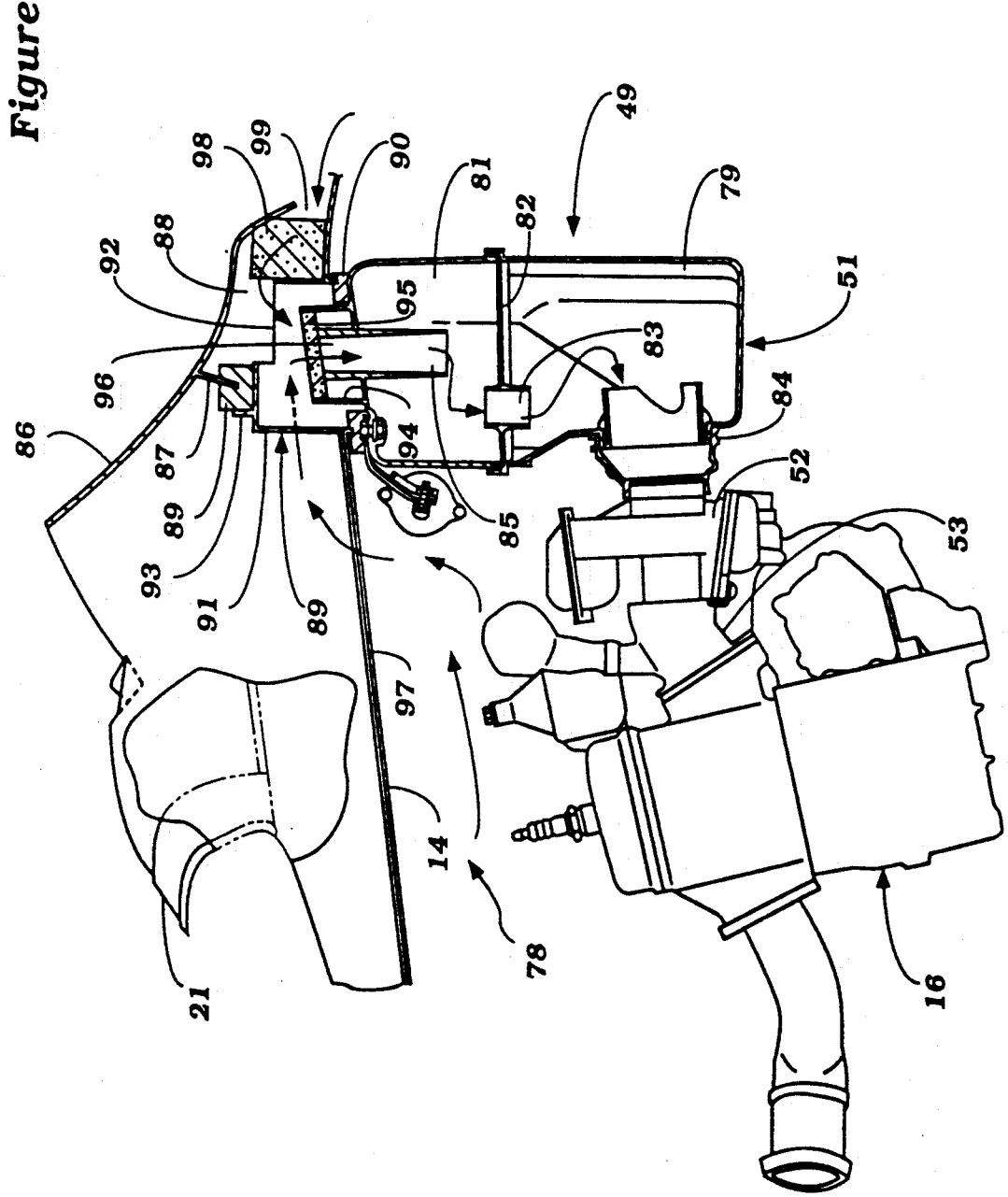
FIG. 6 is a cross sectional view taken along the line 6—6 of FIG. 5.
Figure 7:
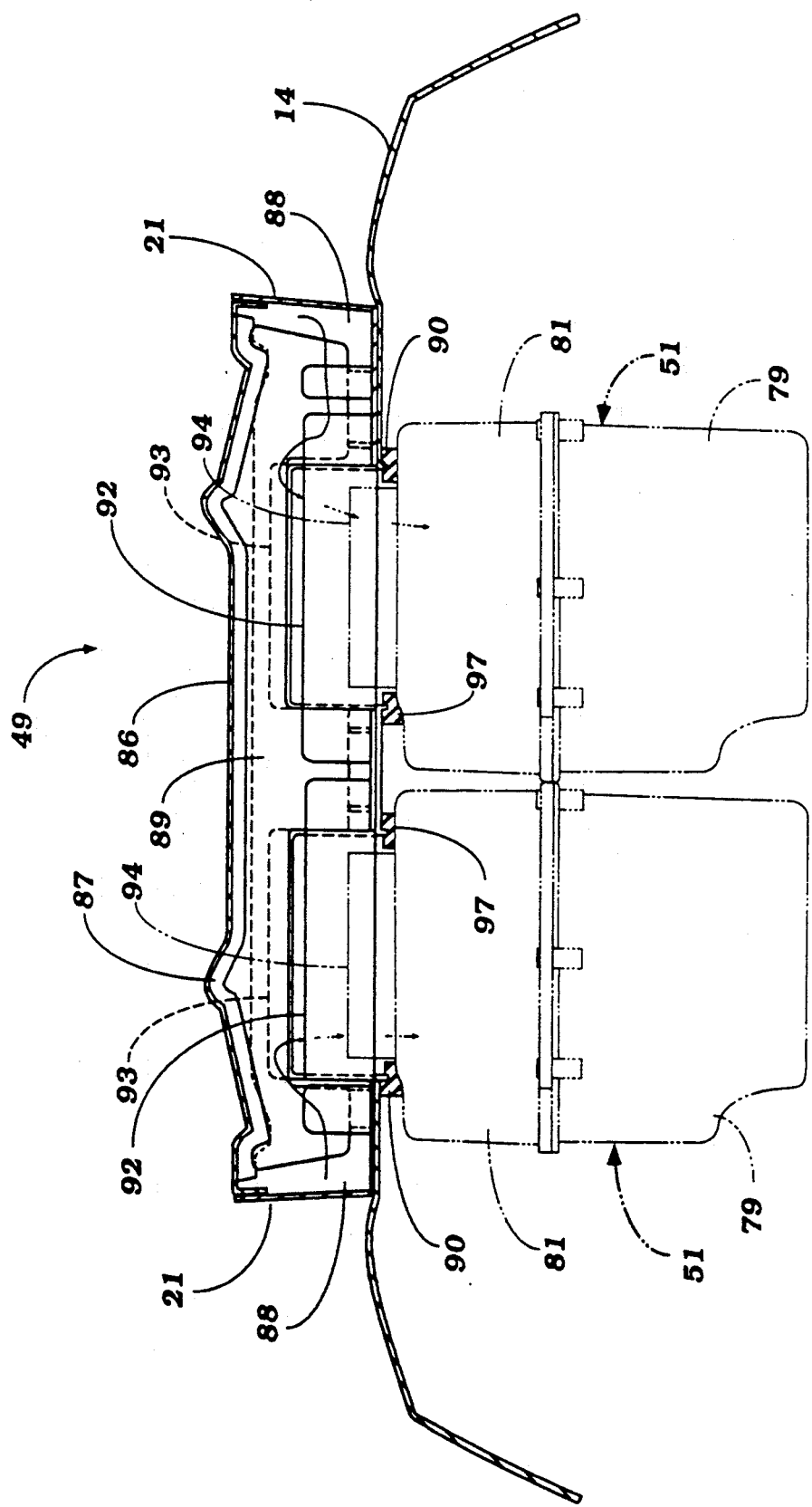
FIG. 7 is a cross sectional view taken along the line 7—7 of FIG. 5.

Referring first to FIGS. 1-3, a snowmobile constructed in accordance with an embodiment of the invention is identified generally by the reference numeral 11. The snowmobile 11 includes a body assembly 12 made up of a number of parts which may be formed from suitable materials and which includes a nose piece 13 an upper engine cowling 14 and a lower tray 15 which together define an engine compartment in which a powering internal combustion engine, indicated generally by the reference numeral 16 is positioned.

In the illustrated embodiment, the engine 16 is of the inline four cylinder type operating on a two cycle crankcase compression principal. Although the engine 16 is described as being a four cylinder inline engine, it will be apparent as the description proceeds that the engine 16 is, in fact, comprised of two, two cylinder inline engines joined end to end. Although the invention has particular utility in conjunction with such engines, it is to be understood that certain facets of the invention may be employed with engines of other types. However, the invention does have particular utility in conjunction with two cycle crankcase compression engines, for a reason which will become apparent.

The body 12 further includes a rear body portion 17 that accommodates a seat 18 adapted to seat one or more riders seated in straddle fashion. A handlebar assembly 19 is positioned forwardly of the seat 18 for steering of the snowmobile, in a manner which will be described.

There is provided further an upper cowling portion 21 which may be removable to access the engine compartment and which carries an upper windshield 22 that is disposed forwardly of the handlebar assembly 19 for affording protection to the riders seated on the seat 18.

A pair of front skis 23 are supported at the forward portion of the body 12 by means of suspension struts 24 which also accommodate steering movement of the skis 23. The struts 24 are interconnected by means of a tie rod 25 so that they may be steered in unison and one of the skis 24 is provided with a steering link 26 which is connected to a steering rod 27 which is, in turn, operated by a steering column 28 that is coupled to the aforementioned handlebar assembly 19.

Rearwardly of the front skis 25, and beneath the seat 18, the body 12 suspends a carriage assembly, indicated generally by the reference numeral 29 by a suitable suspension system and which carriage assembly 29 supports a drive belt, indicated at 31. The drive belt 31 is trained around a driving sprocket 32, which is driven in a manner to be described, and idler sprockets 33 and 34 that are mounted on a pair of rails 35 of the carriage 29. In addition, further idler rolls 36 and 37 are carried by the carriage 29 and engage the drive belt 31 so as to confine and direct its path of movement. The rear idler wheels 37 are carried by frame members 38 of the carriage assembly 29 in a suitable manner.

The engine 16 is disposed transversely in the engine compartment and its output shaft drives a belt driveshaft 39 in a manner which will also be described and which belt driveshaft 39 extends transversely to the longitudinal center line of the snowmobile 12 as does the crankshaft or output shaft of the engine 16. This belt driveshaft 39 drives a variable pulley 41 of a variable speed pulley drive mechanism indicated generally by the reference numeral 42. This drive pulley 41 drives a belt 43 which, in turn, drives a driven variable pulley 44 which is affixed to an intermediate shaft 45. The intermediate shaft 45 has affixed to it a sprocket 46 which drives a drive belt 47 which is, in turn, trained around a sprocket that is affixed to a shaft 48 which is also coupled to the belt drive sprocket 32.

The construction of the engine 16 and the drive for the variable pulley 41 and its construction is of the type described in the co-pending application entitled Power Transmission System for Snowmobile, Ser. No. 07/820,326, filed concurrently herewith and assigned to the Assignee hereof, which disclosure is incorporated herein by reference. Basically and has been noted, the engine 16 is of the four cylinder inline type but is actually made up of two inline two cylinder engines connected end to end. The engine 16 also operates on a two stroke crankcase compression principal and as is typical of two cycle crankcase compression engines, the crankcase chamber of the engine 16 is divided into individual chambers each of which are sealed from each others and each of which is associated with a respective one of the engine cylinder bores.

An intake charge is delivered to the crankcase chambers from this induction system which is identified generally by the reference numeral 49 and which is shown in most detail in FIGS. 4-8. The induction system 49 includes a pair of air boxes 51 to which atmospheric air is admitted and which is filtered in a manner to be described and then delivered to a pair of carburetors 52. The carburetors 52 communicate with a manifold 53 that then supplies air to a respective inlet port formed in the respective cylinder block and in which a reed type check valve is provided so as to permit flow into the individual crankcase chambers but not in the opposite direction when the charge is compressed by the downward movement of the pistons.

As is noted in the co-pending application, Ser. No. 820,326, the charge admitted to the crankcase chambers of the cylinder blocks of the engine as transferred through scavenge ports to the combustion chamber then fired by an ignition system of the type described therein and exhausted through exhaust ports also formed in the individual cylinder blocks. As is noted in the co-pending application Ser. No. 07/820,327, the firing order of the engine 16 and firing timing is such that no two cylinders fire at the same time and the cylinders of each cylinder block fire at 180 degrees from each other. The cylinders of one cylinder block also fire at 90 degrees from the corresponding cylinders of the other cylinder block. The reasons for this will become apparent.

The exhaust ports open through the forward side of the cylinder blocks and communicate with an exhaust system of the type described in more detail in the co-pending application entitled Exhaust System For Snowmobile, Ser. No. 820,327, filed on the same day as this application and assigned to the Assignee hereof. The disclosure of that application is incorporated herein by reference. Briefly, the exhaust system comprises a first paired exhaust manifold 54 having two inlets and a common outlet (FIGS. 1 and 2). Because the cylinders of this cylinder block fire at 180 degrees from each other, the firing pulses in the paired manifold 54 will not cause any adverse effects since the exhaust pulses from one exhaust port will not reflect back to the other at any time when it is open to any significant amount. In a similar manner, the exhaust ports of the other cylinder block also communicate with a paired manifold 55 and again since these cylinders fire at 180 degrees from each other, the pairing of the exhaust ports will have no adverse effects.

A pair of exhaust pipes 56 and 57 extend from the manifolds 54 and 55, respectively and terminate at separate inlets to in a common expansion chamber, silencer 58 positioned at one side of the snowmobile 11 and at one end of the engine 16. Again, because of the fact that the cylinders fire at 90 degrees from each other, their common communication with a single silencing device 58 will not provide any adverse effect of exhaust gas pulses traveling back through the exhaust system to the individual exhaust ports. The exhaust silencer 58 has a common atmospheric exhaust outlet.

As has been noted, the engine 16 is liquid cooled and to this end its cylinder blocks and cylinder heads are provided with cooling jackets which communicate with each other. The cooling system for the engine 16 and the manner in which water is circulated through it is described in more detail in the copending application entitled Cooling System For Snowmobile, Ser. No. 07/820,328, filed concurrently herewith and assigned to the Assignee hereof, the disclosure of which is incorporated herein by reference. Briefly, however, this cooling system includes passages that extend through the crankcase chambers from the rear side of the engine 16 to the front side of it for delivering coolant to the cylinder block cooling jackets and, at the same time, cooling the crankcase chambers. This coolant is circulated by coolant pump 59 that is positioned on the rear side of the engine and which is driven in a manner as described in the aforenoted co-pending application Ser. No. 820,328.

A thermostat assembly 61 is positioned on the intake side of the cylinder head cooling jackets and circulates the coolant back to the heat exchanger system which will now be described by particular reference to FIGS. 1 and 2. This heat exchanger system is of the type described in more detail in the co-pending application entitled Wind Leading System For Snowmobile, Ser. No. 07/820,324, filed concurrently herewith and assigned to the Assignee of this application, the disclosure of which is incorporated herein by reference. Basically this heat exchanger system includes a cross flow radiator 62 that is disposed generally above the engine and specifically above the exhaust manifolds 54 and 55. A conduit 63 communicates the thermostat 61 with the left hand side of the cross flow radiator 62. Coolant is then delivered from the other side of the cross flow radiator 62 to a conduit 64 that extends along the right side of the snowmobile and which then curves inwardly to communicate with a longitudinally extending heat exchanger 65 that extends along one side of the underside of the seat 18. The seat 18 is constructed and configured so that air can flow across the heat exchanger 65 for its cooling but some heat will also be transferred to the seat 18 so as to warm the riders.

At the rear end of the seat 18, the heat exchanger 65 communicates with a conduit 66 that supplies coolant to a further transversely extending heat exchanger 67. The heat exchanger 67 then communicates with a conduit 68 which delivers the coolant to a further longitudinally extending heat exchanger 69 which extends parallel to the heat exchanger 65 on the other side of the seat 18. The heat exchanger 69 communicates at its forward end with a conduit 71 that delivers the coolant to the coolant pump 59. The cooling system is also provided with an expansion tank 72 that accommodates for changes in volume of the coolant due to changes in its temperature.

The upper cowling piece 14 is provided with a pair of nostril like ar inlet openings 73 which receive ram air flowing in the direction of the arrows in FIGS. 1-3 and direct this air to the radiator 62. The air then can exist through a pair of rearwardly positioned ducts 74 formed on opposite sides of the cowling piece 21 so that the heated air flow will be directed away from the handlebar assembly 19. It is desireable to insure that this air flow does not pass across the hands of the rider because of the moisture in the air which could chill the rider's hands and body. Therefore, the air flow is clearly directed away from the rider and the rider's comfort is maximized.

In addition to providing an arrangement for cooling the radiator 62, the air system including the inlets 73 also provides a source of atmospheric air which is heated and delivered to the engine induction system 49. As may be seen in FIG. 4, the inlet nostrils 73 direct air across the cross flow radiator 62 and then cause this air to exit through the exit ducts 74. A baffle plate 75 extends beneath the cross flow radiator 62 and any water vapor in the inlet air which condenses will collect under the radiator 62 and be discharged downwardly from beneath the engine compartment through a drain tube 76. The expansion tank 72 may also have an overflow pipe which communicates with this drain 76 so as to insure that no water can condense in the engine compartment.

There are also provided at the front of the body 12 Nassa type ducts 77 which admit air to the engine compartment, which is generally identified by the reference numeral 78. This air will flow rearwardly across the engine 16 and be heated by it. A portion of this heated air is then delivered to the air boxes 51 in a manner which will be described by particular reference to FIGS. 4 through 7.

It will be noted that each of the air boxes 51 is comprised of a lower member 79 and an upper member 81 which have mating flanges that are connected to each other by a suitable fastener with a baffle plate 82 being positioned there between. The baffle plate 82 is formed with a tuning neck 83 that communicates a chamber formed by the baffle plate 82 and the upper member 81 with a chamber formed by the baffle plate 82 and the lower member 79. The lower member 79 is provided with an outlet neck 84 that is slipped onto the inlet horns of each of the carburetors 52.

The upper air box member 89 is provided with an inlet tuning neck 85 through which atmospheric air is drawn, in a manner to be described, and then expands into the chamber formed on the upper side of the baffle 82, is contracted to pass through the tuning neck 83 and then expands again in the chamber formed under the baffle 82. This successive expansion and contraction causes a silencing of the intake air flow.

The upper cowling piece 21 of the body 12 has a rearwardly facing dash panel 86 that may mount certain instruments and other controls for the control of the snowmobile by an operator seated on the seat 18. This dash panel 86 has a downwardly extending flange portion 87 which defines an air inlet cavity 88 positioned to the rear portion of the cowling piece 21. This air inlet cavity 88 is partially sealed in a forward direction by a seal 89 carried by the dash piece flange 87 and which is engaged with a wall arrangement indicated generally by the reference numeral 89 and which includes a transversely extending front wall 91 and a pair of side walls which have cut out recesses 92 so as to afford limited air access from a forward direction to the inlet cavity 88. The wall 89 has a flange portion 93 that engages the seal 89 so as to provide restricted air flow through this area.

The inlet neck 85 of each air box 49 is surrounded by an upstanding flange 94 which forms an inlet chamber across which an air filter element 95 is positioned so as to filter any air entering into an upper or inlet end 96 of the tuning neck 85. Air may exit from the engine compartment 78 through openings 97 formed in the upper body member 14 and into the cowling area beneath the upper cowling 21 for flow through the recesses 92 into the air inlet cavity 88. This air will have been heated by its flow through the engine compartment and this heated air is then filtered by the filter element 95 and induced into the induction system 49 as aforedescribed.

The air boxes 51 carry peripheral seals 90 which provide sealing to the air inlet box 88 and the upper body member 14. It should be noted that the air filter 95 is positioned within the cowling and specifically within the inlet cavity 88 and hence cannot be readily viewed by an operator. When the snowmobile operates in a snowy terrain, it will be possible for snow particles to be drawn into the inlet opening 88 and these snow particles can obstruct the filter 95 and adversely effect the operation of the engine. There is no way that the operator can determine the condition of the air filters 95 without removing the cowling assembly and this is obviously undesirable.

In accordance with an important feature of the invention, therefore, there is provided a further or secondary air filter element 98 that is disposed adjacent a rearwardly facing air inlet 99 formed below the dash member 86 and above the cowling piece 14 and readily viewable by the operator. The filter element 98 is of the same coarseness or maybe finer than the filter element 95. Since the filter element 98 is readily viewable by the operator, the operator will be able to determine when the filter element 98 is clogged and this will also provide an indication when the filter elements 95 need servicing. In this way, the operator will be able to readily determine the condition of the air filters of the system and service them without having to disassemble the body portion in order to determine the condition of the filters.

It should also be noted that the air flowing through the inlet opening 99 is not heated and hence the temperature of the air delivered to the induction system 49 will be a mixture of heated air from the air flowing through the engine compartment 78 and unheated air directly flowing from the atmosphere. This mixing of heated and unheated air will provide good assurance of uniform temperature of air flow to the induction system regardless of the ambient temperature. This will greatly improve the volumetric efficiency of the engine and also permit better calibration of the fuel air mixture under all running conditions. The proportion of the heated and unheated air can be governed by suitably adjusting the air flow paths through the respective systems (heated and unheated). In a preferred embodiment more atmospheric unheated air is inducted than heated air.

Positioned to the rear of the control panel 86 and supported by the snowmobile body 12 is a fuel tank 101 that is disposed forwardly of the seat 18 and which has a fill neck 102 that is accessible and openable panel 103. The fuel tank 101 supplies fuel to the carburetors 52 in a suitable manner.

It should be readily apparent from the foregoing description that the described embodiment provides an extremely effective induction system for the engine of a snow vehicle wherein the clogging of the filter system can be readily viewed by an operator without having to open any portion of the engine compartment. In addition, by mixing air heated through the engine compartment with direct atmospheric air it is possible to maintain a uniform and relatively low temperature of the air inducted to improve the engine volumetric efficiency. Of course, the foregoing description is that of the preferred embodiment of the invention and various changes and modifications may be made without departing from the spirit and scope of the invention, as defined by the appended claims.

I claim

1. An induction system for the internal combustion engine of a snow vehicle having a body defining an engine compartment in which said engine is at least in part contained, said engine having an intake port, said induction system having an outlet communicating with said intake port and first air filter for filtering air flowing through said intake port, said first air filter being positioned within said body and normally concealed from view, and a second air filter disposed across an opening in said body for filtering air flowing to said intake port in a position exposed to view so that an operator may view if snow is clogging said second air filter.

2. An induction system as set forth in claim 1 further including means for heating at least a portion of the atmospheric air flowing to said intake port.

3. An induction system as set forth in claim 2 wherein the means for heating the atmospheric air is comprised of a duct passing through the engine compartment for heating the air flowing through the duct.

4. An induction system as set forth in claim 3 wherein the heated air must flow through the first air filter.

5. An induction system as set forth in claim 4 wherein the second air filter is positioned in a second alternate air passage communicating atmospheric air with the intake port.

6. An induction system as set forth in claim 5 wherein the second alternate flow path has a lesser flow resistance than the heated flow passed so that more unheated atmospheric air is delivered to the induction system than heated atmospheric air.

7. An induction system as set forth in claim 1 wherein the engine compartment is defined by a downwardly sloping hood having an air inlet opening formed in a forward portion thereof for effecting air flow into the engine compartment for heating thereby before delivery to the first air filter element, the second air filter element being positioned across an external opening in a portion of the body to the rear of the engine compartment.

8. An induction system as set forth in claim 7 wherein the heated air must flow through the first air filter.

9. An induction system as set forth in claim 1 wherein the second air filter filters only a portion of the air flowing to the intake port.

10. An induction system as set forth in claim 9 wherein the first air filter filters all of the air flowing to the intake port.

11. An induction system as set forth in claim 10 wherein the first and second air filter have different degrees of coarseness.

12. An induction system as set forth in claim 9 wherein the engine compartment is defined by a downwardly sloping hood having an air inlet opening formed in a forward portion thereof for effecting air flow into the engine compartment for heating thereby before delivery to the first air filter element, the second air filter element being positioned across an external opening in a portion of the body to the rear of the engine compartment.

13. An induction system for the internal combustion engine of a snow vehicle having a body defining an engine compartment in which said engine is at least in part contained, said engine having an intake port, said induction system having an outlet portion communicating with said intake port, a first portion extending to said outlet portion from a first atmospheric inlet through said engine compartment for heating of atmospheric air delivered to said intake port and a second portion extending from a second atmospheric inlet to said outlet portion substantially free of said engine compartment.

* * * * *